United States Patent
Li et al.

(10) Patent No.: US 7,392,954 B2
(45) Date of Patent: Jul. 1, 2008

(54) METHOD AND APPARATUS FOR REDUCING PIN COUNT FOR CONNECTION OF A MINIATURIZED FORM FACTOR CARD IN A MOBILE INFORMATION DEVICE

(75) Inventors: Taojin Li, Hangzhou (CN); Shanquan Bao, Alameda, CA (US); Jie Sun, Nanking (CN); Xin Liu, Hangzhou (CN)

(73) Assignee: UTStarcom, Inc., Alameda, CA (US)

( * ) Notice: Subject to any disclaimer, the term of this patent is extended or adjusted under 35 U.S.C. 154(b) by 3 days.

(21) Appl. No.: 11/530,766

(22) Filed: Sep. 11, 2006

(65) Prior Publication Data

US 2008/0121685 A1    May 29, 2008

(51) Int. Cl.
*G06K 19/06* (2006.01)

(52) U.S. Cl. .................. 235/492; 455/558

(58) Field of Classification Search ............ 235/441, 235/451, 492, 380, 381; 439/630, 157, 159; 455/558
See application file for complete search history.

(56) References Cited

U.S. PATENT DOCUMENTS 6,385,263 B1* 5/2002 Bowers et al. .......... 375/356
2003/0016487 A1* 1/2003 Tung-Chieh et al. ....... 361/679
2003/0063567 A1* 4/2003 Dehart .................. 370/252
2005/0120163 A1* 6/2005 Chou et al. .............. 711/103
2005/0120253 A1* 6/2005 Morrow et al. ............ 713/300

OTHER PUBLICATIONS

LM2502 Mobile Pixel Link (MPL) Display Interface Serializer and Deserializer.

* cited by examiner

*Primary Examiner*—Steven S. Paik
*Assistant Examiner*—Tuyen K Vo

(57) ABSTRACT

A reduced pin count connection system for an insertable operational systems card having a plurality of input and output signals to a host device having operational circuits responsive to the input and output signals of the card includes a master serial data link in the card for communicating at least a portion of the plurality of input and output signals of the card. A slave serial data link is operably interconnected to the master serial data link through a connector having a second plurality contacts less than the plurality of input and output signals and communicates the input and output signals to the operational circuits in the host device.

8 Claims, 3 Drawing Sheets

US 7,392,954 B2

METHOD AND APPARATUS FOR REDUCING PIN COUNT FOR CONNECTION OF A MINIATURIZED FORM FACTOR CARD IN A MOBILE INFORMATION DEVICE

REFERENCE TO RELATED APPLICATIONS

This application is co-pending with U.S. application Ser. No. 11/308,221 filed on Mar. 13, 2006 entitled MINIATURIZED FORM FACTOR WIRELESS COMMUNICATIONS CARD FOR GENERIC MOBILE INFORMATION DEVICES and with U.S. application Ser. No. 11/308,559 filed on Apr. 6, 2006 entitled CONNECTOR FOR A HIGHLY INTEGRATED, INSTALLABLE MINIATURIZED FORM FACTOR CARD FOR WIRELESS COMMUNICATIONS FUNCTIONS both having the same assignee as the present application, the disclosures of which are incorporated herein as though fully set forth.

BACKGROUND OF THE INVENTION

1. Field of the Invention

This invention relates generally to the field of internal device interconnection and more particularly to the use of a serial data link for connection of a miniaturized form factor communications card to a mobile information device for reducing the pin count in the connector.

2. Description of the Related Art

Connection of removable elements in an electronic device such mobile information devices is typically accomplished using multiple connection blade, pin, ball or multipad elastomeric connectors. For elements which will regularly be inserted and removed from the mobile information device, particularly by end users, the greater the number of inputs connected through the connector the higher the likelihood of failure of the connector due to breakage or contamination. For devices such as a wireless communications system as disclosed for a miniaturized form factor card in copending application Ser. No. 11/308,221 filed on Mar. 13, 2006 entitled MINIATURIZED FORM FACTOR WIRELESS COMMUNICATIONS CARD FOR GENERIC MOBILE INFORMATION DEVICES a large number of communication and system interface functions must be accommodated and a typical embodiment employs either a 70 or a 49 pin connector depending on the level of integration in the miniaturized form factor card. A reduction in pin count of the connector would simplify the connector itself and reduce cost while simultaneously reducing the potential for damage to the connector elements on the card or in the mobile information device.

It is therefore desirable to provide a system with reduced pin count connection for a card insertable in a mobile information device to reduce the potential for damage.

It is also desirable to provide a system with reduced pin count connection for a card insertable in a mobile information device to reduce connector complexity and cost.

It is further desirable to increase the functionality of an insertable card without requiring additional pin count for the added functions.

SUMMARY OF THE INVENTION

The present invention provides a reduced pin count connection system for an insertable operational systems card having a plurality of input and output signals to a host device having operational circuits responsive to the input and output signals of the card. A master serial data link is provided in the card for communicating at least a portion of the plurality of input and output signals of the card. A slave serial data link is operably interconnected to the master serial data link through a connector having a second plurality contacts less than the plurality of input and output signals and communicates the input and output signals to the operational circuits in the host device.

For an exemplary embodiment, the host device is a mobile information device and the insertable operational systems card is a wireless communications card providing operational functions to the host including voice data using a speaker/microphone system and control signals to an LCD. The card receives input from a keyboard integrated in the host with the voice data, control signals and keyboard input transmitted through the master and slave serial data links.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1:
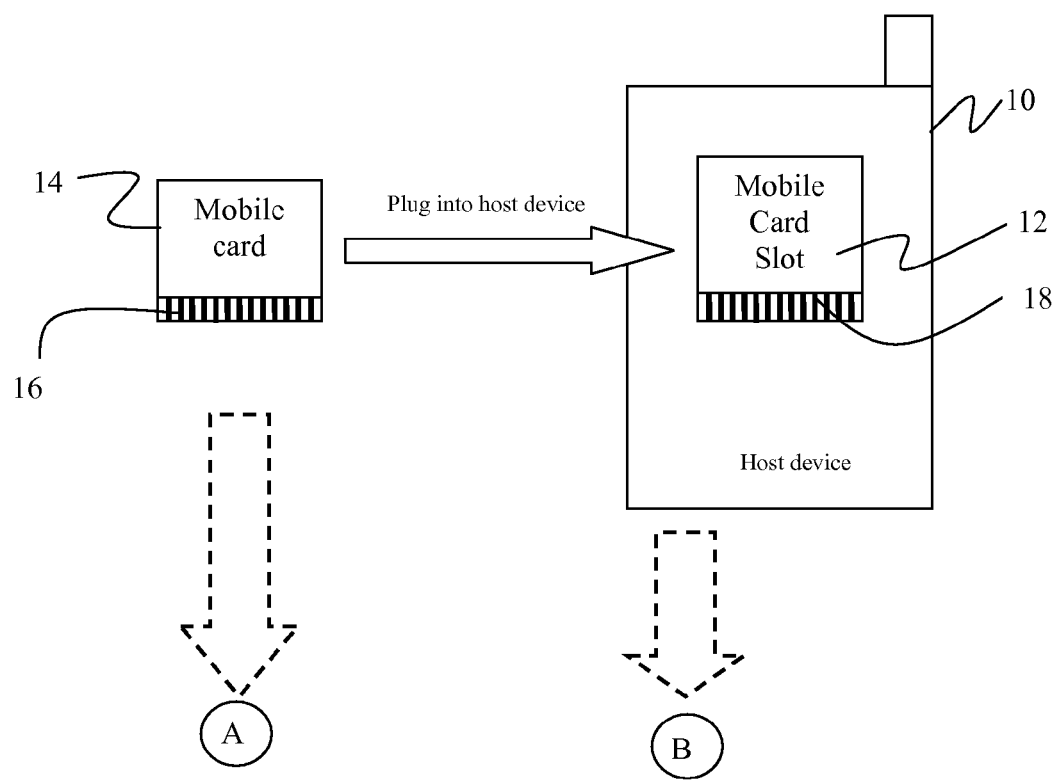
FIG. 1 is a pictorial representation of a miniaturized form factor card and a mobile information device in which the card is removably inserted with reference to the two connector moieties of an embodiment of the present invention.

Referring to the drawings, FIG. 1 shows a mobile information device 10 provided with a connection slot 12 to receive a miniaturized form factor card 14, such as that described in patent application Ser. No. 11/308,221 previously referenced, to provide wireless communications or other operational functions to the mobile information device which hosts the card. The connection functions A provided through the connector moiety 16 on the card are compatible with the connection functions B provided through the connector moiety 18 associated with the connection slot for the card in the mobile information device.

Figure 2:
FIG. 2 is a block diagram of the internal elements of the data transmission elements in the miniaturized form factor card and the mobile information device which exchange data for cooperative operation of the mobile information device with the card inserted.
Figure 2:
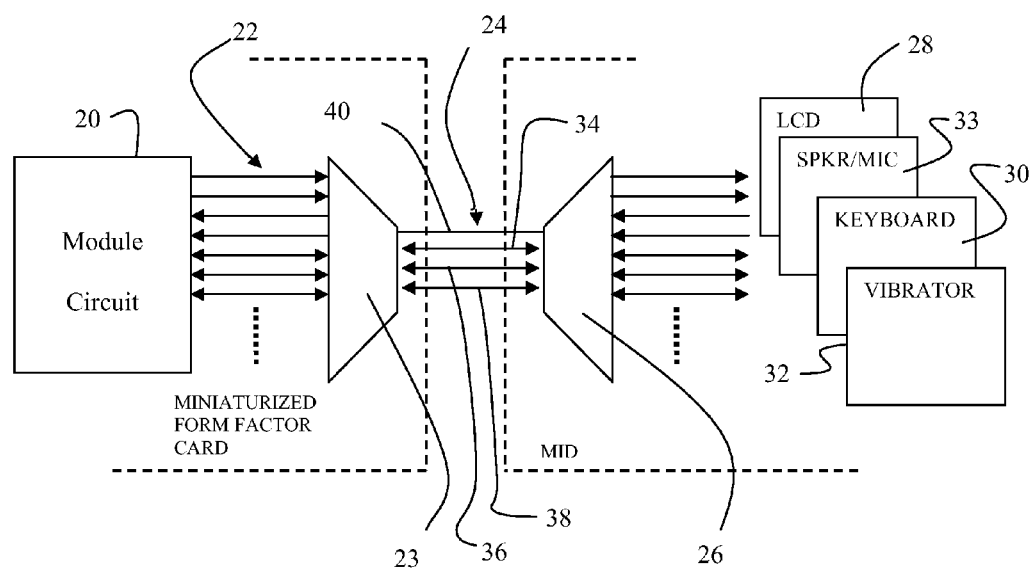

As shown in FIG. 2 the connection functions A of the card provide the interface for the operational circuits 20 in the card. The input and output requirements for an exemplary embodiment of the card are shown in table 1 and represented by the exemplary bus lines 22 in FIG. 2.

TABLE 1

| Type | Modem only | Handset Core |
| --- | --- | --- |
| Total Pin Count | 49 | 70 |
| Black White LCD IF | N/A | Support |
| 8 Bit Color LCD IF | N/A | Support |
| Keypad IF | N/A | Support |
| Audio(Mic, Spkr, Earphone) IF | Support | Support |
| SIM IF | Support | Support |
| USB IF | Support | Support |
| UART IF | Support (2) | Support (1) |
| 4 bit SDIO IF | Support | N/A |
| RF IF | Support | Support |

A master serial data link (SDL) 23 is provided in the card to convert at least a portion of the signals from operational circuits for transmission as serial data over the interface connections 24 to a slave SDL 26 in the mobile information device. Only signals transmitted between the SDL converting circuits are shown in the embodiment in the drawings, however, in alternative embodiments predetermined signal paths are provided directly through pin elements in the connectors in combination with the SDL pins. The slave SDL provides signals to and from the operational circuits in the mobile information device such as the display circuit 28 (LCD), the keyboard circuit 30 and the vibrator circuit 32 as well as voice data using the speaker/microphone system 33. The operational circuits identified in the embodiment shown in the drawings are exemplary and other operational circuits for both the card and mobile information device are employed in alternative embodiments. The SDL converting circuits communicate using three connector elements to provide a master clock MC 34, a first master data signal (MD0) 36 and a second master data signal (MD1) 38. A ground 40 is employed in the circuit embodied in the drawings.

Figure 3:
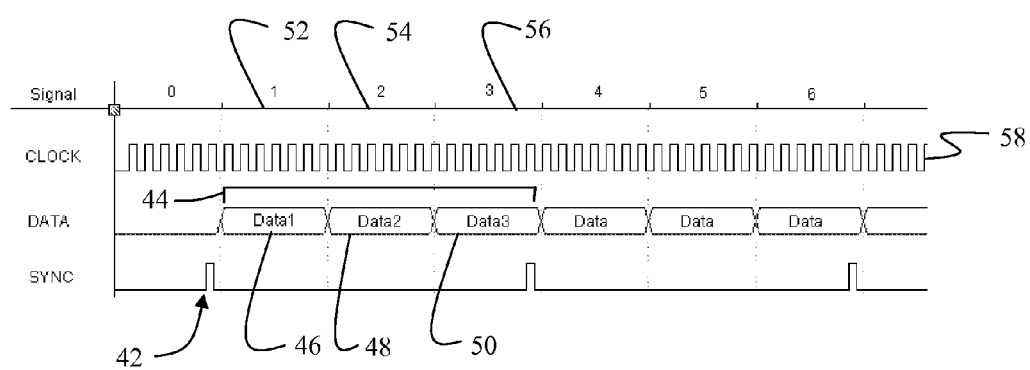
FIG. 3 is a data diagram of transmission through the serial data link interface.

The data input/output for the operational circuits of the card and MID for the SDL is shown in FIG. 3. Three signal types need to be transferred through SDL Bridge: LCD, Voice, and keyboard. As shown in FIG. 3, a synchronization signal (SYNC) 42 is used for synchronization of frames and identifies initiation of a new frame of data. A complete frame 44 of data includes three signals sets: LCD (data 1) 46, voice (data2) 48, and keyboard (data3) 50. Data transferred in a first time slot 52 in the frame (data1) constitutes the LCD signal. Data transferred in a second time slot 54 in the frame (data2) constitutes the voice signal. Data transferred in a third time slot 56 in the frame (data3) constitutes the keyboard signal. Frames are continuously transmitted according to the SYNC signal for communication between the MID and the card operational circuits. Data transfer is accomplished using the master clock signal 58.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A reduced pin count connection system comprising:
    an insertable operational systems card having a plurality of input and output signals;
    a host device having operational circuits responsive to the input and output signals of the card;
    a master serial data link communicating at least a portion of the plurality of input and output signals of the card;
    a slave serial data link operably interconnected to the serial data link through a connector having a second plurality contacts less than the plurality of input and output signals and communicating the input and output signals to the operational circuits in the host device.

2. A system as defined in claim 1 wherein the host device is a mobile information device and the insertable operational systems card is a wireless communications card providing operational functions to the host including voice data using a speaker/microphone system and control signals to an LCD, the card further receiving input from a keyboard integrated in the host, said voice data, control signals and keyboard input transmitted through the master and slave serial data links.

3. A system as defined in claim 2 wherein transmission through the master and slave serial data links is accomplished in frames responsive to a synchronization signal, said frames including a plurality of data types.

4. A system as defined in claim 3 wherein at least one of said data types in each frame is voice data.

5. A method for reduced pin count interconnection of an operational systems card insertable in a host device comprising the steps of:
    providing a master serial data link communicating at least a portion of a plurality of input and output signals from operational systems in the card;
    connecting the master serial data link through a connector having a second plurality of connections less than the plurality of input and output signals to a slave serial data link;
    communicating the portion of the plurality of input and output signals from the slave data link to operational circuits in the host device.

6. A method as defined in claim 5 wherein the host device is a mobile information device and the insertable operational systems card is a wireless communications card, and wherein the plurality of input and output signals comprise voice data and control signals, the operational circuits in the host including a speaker/microphone system interacting with the voice data signals and an LCD display and keyboard interacting with the control signals.

7. A method as defined in claim 6 wherein the step of communicating includes transmitting frames through the master and slave serial data links responsive to a synchronization signal, said frames including a plurality of data types.

8. A method as defined in claim 7 wherein at least one of said data types in each frame is voice data.

* * * * *